United States Patent [19]

Paetz

[11] 4,094,944
[45] June 13, 1978

[54] MACHINE FOR AND CONTINUOUS PROCESS OF MAKING MOLDED TILE

[75] Inventor: Frederic Harold Paetz, Newark, Ohio

[73] Assignee: Owens-Corning Fiberglas Corporation, Toledo, Ohio

[21] Appl. No.: 734,772

[22] Filed: Oct. 22, 1976

[51] Int. Cl.² .................. B29C 27/22; B29D 3/02
[52] U.S. Cl. .................. 264/137; 83/152;
156/199; 156/245; 156/250; 156/306; 264/157;
264/257; 264/261; 264/263; 264/294; 264/297;
264/320; 425/289; 425/403.1; 425/520;
425/DIG. 201
[58] Field of Search ............... 264/157, 257, 259, 266,
264/294, 297, 160, 109, 112, 113, 118, 119, 153,
261, 263; 214/6 FS; 156/199, 209, 219, 220,
250, 269; 425/DIG. 201, 510, 521, 299, 324.1,
304, 385, 289, 294, 403.1, 520; 83/9, 39, 40, 51,
86, 152; 100/94, 95, 96, 39, 137, 207; 53/159

[56] References Cited

U.S. PATENT DOCUMENTS

| 1,581,774 | 4/1926 | Zeh | 214/6 A |
|---|---|---|---|
| 2,167,734 | 8/1939 | Zonino | 264/160 |
| 2,887,964 | 5/1959 | Griner | 425/289 |
| 2,961,810 | 11/1960 | Johnson et al. | 53/159 |
| 3,137,601 | 6/1964 | Menzer | 264/257 |
| 3,244,082 | 4/1966 | Lemelson | 425/DIG. 201 |
| 3,262,584 | 7/1966 | Hayford et al. | 214/6 A |
| 3,309,450 | 3/1967 | Rogers | 264/257 |
| 3,350,744 | 11/1967 | Sederlund | 425/DIG. 201 |
| 3,367,821 | 2/1968 | Kleyt et al. | 156/269 |
| 3,532,779 | 10/1970 | Wienand | 264/257 |
| 3,608,264 | 9/1971 | Jones et al. | 52/588 |
| 3,731,568 | 5/1973 | Brock et al. | 264/153 |
| 3,876,057 | 4/1975 | Jones | 53/159 |
| 3,924,023 | 12/1975 | Boranian et al. | 264/160 |
| 3,989,581 | 11/1976 | Kober et al. | 264/118 |
| 4,035,215 | 7/1977 | Goldstone | 156/245 |

Primary Examiner—Willard E. Hoag
Attorney, Agent, or Firm—John W. Overman; Ronald C. Hudgens; Paul J. Rose

[57] ABSTRACT

Strips of uncured glass wool, facing material, and backing material are intermittently fed from supply rolls into a multi-cavity molding press, and then into a trim press where molded tiles are severed from each other. A multi-cavity vacuum head transfers the tiles into stacks on a conveyor. When each stack has a certain number of tiles, the conveyor moves the stacks to a packaging station.

5 Claims, 3 Drawing Figures

U.S. Patent June 13, 1978 4,094,944
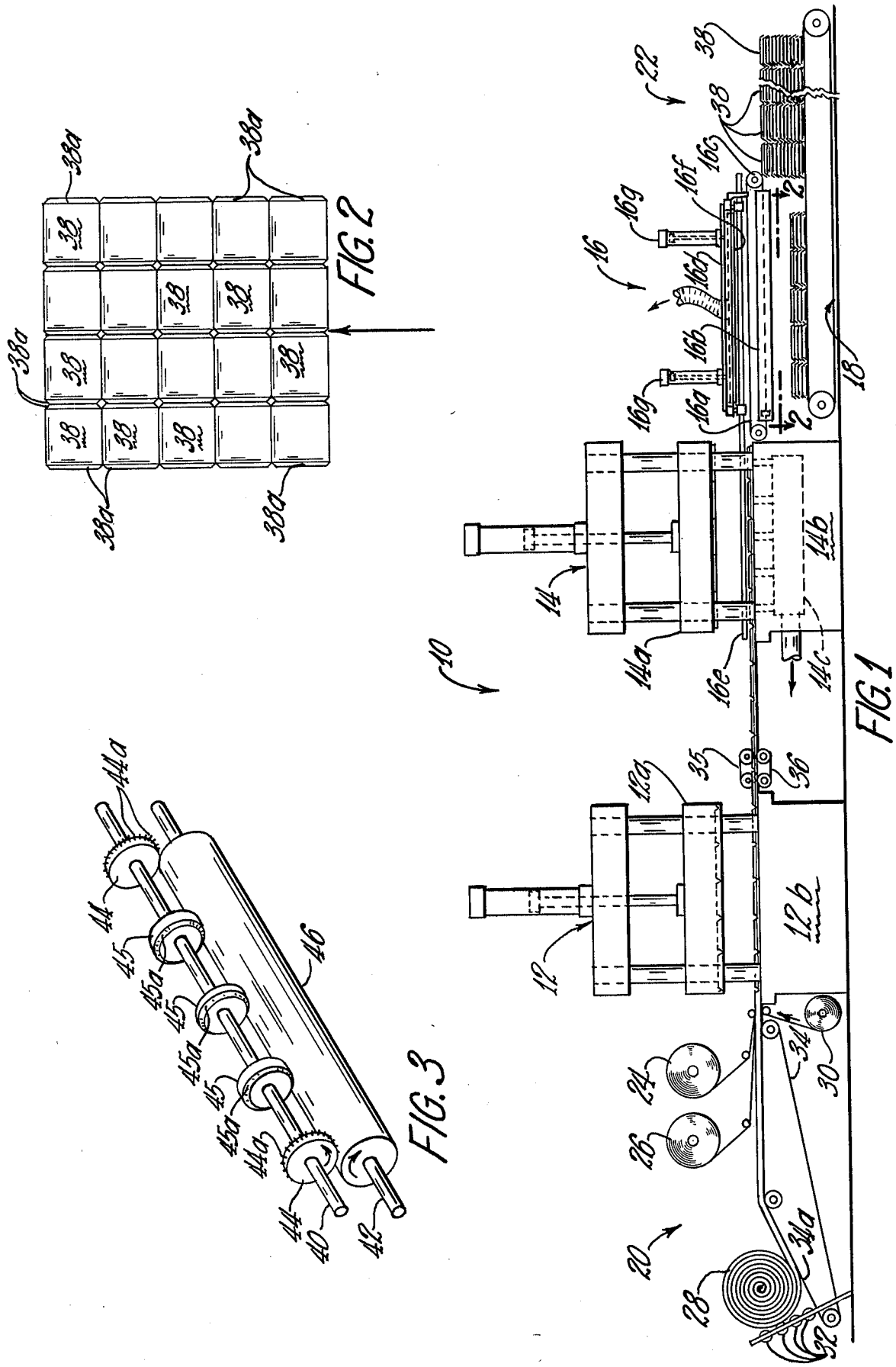

MACHINE FOR AND CONTINUOUS PROCESS OF MAKING MOLDED TILE

This invention relates generally to ceiling tile, and more particularly to a machine for and continuous process of molding ceiling tile from fibrous glass in a multi-cavity press, severing the tiles from each other in a trim press, and stacking the tiles for packaging.

An object of the invention is to provide means for molding, severing, and stacking molded ceiling tiles in a continuous process.

In the Drawings

FIG. 1 is a side elevational view of a molded tile making machine constructed in accordance with the invention;

FIG. 2 is an enlarged plan view of grouped stacks of tiles, taken generally along the line 2—2 of FIG. 1, an arrow indicating the direction of travel through the machine; and FIG. 3 is an enlarged perspective view of a preferred alternative driving means for the tile material.

The tile of the machine and process of this invention is generally similar to that disclosed in U.S. Pat. No. 3,608,264, issued Sept. 28, 1971. With respect to the drawings, a machine 10 constructed in accordance with the invention is shown in FIG. 1 and includes a molding press 12, a trim press 14, tile transfer apparatus 16, a stacked tile conveyor 18, and a supply station 20. A packaging station 22 is indicated at the output end of the conveyor 18.

The supply station 20 includes a roll 24 of porous non-woven fabric, a roll 26 of preferably white vinyl plastic, a roll 28 of fibrous glass wool with uncured binder or bonding agent, and a roll 30 of crepe paper or wadding. Also included in the supply station 20 but not separately shown is polyethylene film preferably wound in the roll 28 to separate the layers of uncured wool. It is within the scope of the invention, however, to incorporate the polyethylene film in the roll 30 or to supply it from a separate roll for feeding between the wool from the roll 28 and the paper from the roll 30. The rolls 24, 26, and 30 are supported on suitable framework. The roll 28 is supported in a V-shaped trough formed by a series of rollers 32 and an inclined portion 34a of a conveyor belt 34.

The non-woven fabric, vinyl plastic, uncured wool polyethylene film, and crepe paper or wadding are fed intermittently from the supply station 20 to the molding press 12 by the conveyor belt 34 and a pair of suitably mounted opposed pulling belts 35 and 36. The press 12 includes multi-cavity upper and lower die plates disposed respectively in a vertically reciprocable pressing head 12a and on a stationary bed 12b, the die plates having twenty mold cavities arranged in four rows of five as best discernible from twenty stacks of molded tiles 38 shown in FIG. 2. When proper lengths of the materials have been fed into the molding press 12 over the bed 12b thereof, the belts 34, 35, and 36 are stopped and the pressing head 12a is lowered to form the lengths of material under pressure into the shape of twenty molded tiles 38 connected together in four rows of five, and heat is supplied to cure the binder in the wool, melt the polyethylene film to adhere the backing paper from the roll 30 to the molded wool, and melt the vinyl plastic from the roll 26 to adhere it to the molded wool and also to the non-woven fabric from the roll 24. The vinyl plastic flows into the non-woven fabric, and the result is an attractive matted finish on the tiles 38. The paper backing protects against fiber erosion for ease in handling and masks any irregularities in color due to unequal distribution of binder and glass fibers.

Each tile 38 is provided with a pair of oppositely projecting tab portions 38a, as more fully shown in the aforementioned patent. In the four rows of five tiles 38, there are three rows of abutting tabs 38a from adjacent rows of tiles, as shown in FIG. 2. The pulling belts 35 and 36 are three pairs of belts respectively engaging opposite sides of the rows of abutting tabs 38a.

The trim press 14 includes a vertically reciprocable severing and trimming head 14a having suitable knives for severing and trimming the molded tiles 38 and a stationary bed or trim die base 14b having a multi-cavity trim die and a suction or vacuum chamber 14c having separate connections to the twenty cavities of the trim die.

At the time the belts 34, 35, and 36 are stopped and the pressing head 12a lowered, air is evacuated from the suction chamber 14c to apply suction to the twenty cavities of the trim die and thereby accurately locate a previously formed and delivered cluster of 20 tiles 38 for severing and trimming. After the pressing head 12a reaches the pressing pressure, the head 14a of the trim press 14 is lowered to sever and trim the tiles 38. The head 14a is then raised fully out of the way for entrance of the tile transfer apparatus 16 into the trim press 14.

The tile transfer apparatus 16 is actuated horizontally by a pair of endless cables 16a (one of which is shown in FIG. 1) driven by pistons in a pair of pneumatic actuators 16b, (one of which is shown) back and forth around pairs of pulleys 16c. A carriage 16d of the tile transfer apparatus 16 is connected to the cables 16a and reciprocably mounted on a pair of parallel spaced guide rods 16e (one of which is shown). A vacuum head 16f on the underside of the carriage 16d is vertically reciprocable by a plurality of actuators 16g.

When the head 14a is fully raised, the pneumatic actuators 16b advance the carriage 16d by the cables 16a into the trim press 14 on the guide rods 16e. A suction fan (not shown) connected to the vacuum head 16f is then turned on, the vacuum head is lowered by the actuators 16g into contact with the severed tiles 38, and the suction for the suction chamber 14c is turned off. The vacuum head 16f is then raised along with the severed tiles 38 and the actuators 16b retract the carriage 16d out of the trim press 14 to the position shown. The vacuum head 16f is then lowered by the actuators 16g to the conveyor 18 or to previously stacked tiles 38 thereon and the suction fan connected to the vacuum head is turned off, releasing the severed tiles 38. The vacuum head is then raised again by the actuators 16g. After the stacking of a predetermined number of tiles 38, the conveyor 18 is activated to move the stacked tiles to the packaging station 22 for packaging.

The severing, trimming, and stacking of one group of the tiles 38 takes place while another group is being formed in the molding press 12. After the completion of the molding operation, the pressing head 12a is raised and the belts 34, 35, and 36 activated to index the materials for the next cycle. The cycle of the machine 10 is controlled by various limit switches, along with a timer, a photoelectric cell, and a counter, none of which is shown.

FIG. 3 shows a preferred alternative driving means for the tile material, for use in place of the pulling belts 35 and 36. The preferred driving means includes a pair of suitably mounted and driven shafts 40 and 42.

Mounted on the shaft 40 adjacent opposite ends thereof are two pin rolls 44. Three guide rolls 45 equally spaced from each other and from the pin rolls 44 are also mounted on the shaft 40. A back-up roll 46 is mounted on the shaft 42. The rolls 44 are provided with pin means 44a for engaging opposite edges of the tile material. The rolls 45 are provided with bevelled portions 45a corresponding to bevelled portions of the molded tiles 38.

The pulling belts 35 and 36 of the embodiment of FIG. 1 may also be provided with pin means such as the pin means 44a of the rolls 44.

Various modifications may be made in the structure shown and described without departing from the spirit and scope of the invention.

I claim:

1. A continuous process of making molded ceiling tile comprising intermittently feeding a strip of fibrous glass wool having uncured binder thereon and a strip of facing material into a molding press having multi-cavity upper and lower die plates relatively movable toward and away from each other, molding the wool and facing material in the molding press into a cluster of molded tiles by clamping them between the upper and lower die plates under pressure while applying heat to cure the binder, said molding including the forming of a pair of oppositely projecting tabs on each of said tiles, feeding the cluster of molded tiles from the molding press into a severing press while feeding other portions of the strips attached to the cluster into the molding press, said feeding including drivingly engaging said tabs with movable driving means, and severing the cluster in the severing press from the strips and the molded tiles in the cluster into separate tiles arranged in a plurality of rows of tiles by operation of the severing press while molding another cluster of tiles in the molding press.

2. A process as claimed in claim 1 including removing the tiles from the severing press and placing them in a clustered arrangement on a conveyor while molding said another cluster of tiles in the molding press.

3. A process as claimed in claim 2 including repeating the steps thereof and conveying the tiles to a packaging station after clustered stacks of tiles have been formed.

4. A machine for making molded tile from facing material and fibrous glass wool having uncured binder thereon, comprising strip feeding means for intermittently feeding continuous strips of facing material and fibrous glass wool having uncured binder thereon, a molding press for intermittently receiving facing material and fibrous glass wool form the strip feeding means and successively molding it into successive clusters of tiles attached to the remainder of the strips in the strip feeding means with each molded tile in a cluster having a pair of oppositely extending tabs formed thereon during the molding, a severing press spaced from the molding press for successively receiving the clusters and severing them successively one at a time from those following while also severing them into separate tiles, and cluster driving means between the molding press and the severing press for drivingly engaging the tabs on the tiles in a cluster and thereby pulling clusters from the molding press while pulling the strips attached thereto from the strip feeding means into the molding press and feeding clusters into the severing press.

5. A machine as claimed in claim 4 wherein the space between the molding press and the severing press is substantially equal to the length of one cluster of tiles.

* * * * *